US009534683B2

(12) United States Patent
Takehana

(10) Patent No.: US 9,534,683 B2
(45) Date of Patent: Jan. 3, 2017

(54) HYDRAULIC CIRCUIT FOR TRANSMISSIONS

(75) Inventor: Norio Takehana, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 287 days.

(21) Appl. No.: 14/233,336

(22) PCT Filed: Jul. 17, 2012

(86) PCT No.: PCT/JP2012/068079
§ 371 (c)(1),
(2), (4) Date: Mar. 18, 2014

(87) PCT Pub. No.: WO2013/015150
PCT Pub. Date: Jan. 31, 2013

(65) Prior Publication Data
US 2014/0196447 A1  Jul. 17, 2014

(30) Foreign Application Priority Data
Jul. 27, 2011  (JP) .................................. 2011-163897

(51) Int. Cl.
*F16H 57/04* (2010.01)
*F04C 2/10* (2006.01)
(Continued)

(52) U.S. Cl.
CPC ............. *F16H 57/0436* (2013.01); *F04C 2/10* (2013.01); *F04C 11/001* (2013.01);
(Continued)

(58) Field of Classification Search
CPC .......................... F16H 57/0446; F16H 57/0461
See application file for complete search history.

(56) References Cited

U.S. PATENT DOCUMENTS 6,677,685 B2 * 1/2004 Pfleger ............. F16H 61/66272
180/338

FOREIGN PATENT DOCUMENTS

JP      3-4907 A    1/1991
JP  2000-274516 A  10/2000
(Continued)

OTHER PUBLICATIONS

International Search Report dated Aug. 28, 2012 issued in corresponding application No. PCT/JP2012/068079.

*Primary Examiner* — F. Daniel Lopez
(74) *Attorney, Agent, or Firm* — Westerman, Hattori, Daniels & Adrian, LLP

(57) ABSTRACT

Provided is a hydraulic circuit for transmissions with which, while suppressing the hydraulic circuit from becoming complicated, it is possible to suppress an operational failure and a drop in the oil pressure of the hydraulic circuit, and to stabilize an oil pressure in the hydraulic circuit. The CVT 1 includes a part to be lubricated and a hydraulic control part for controlling transmission. The hydraulic circuit for transmissions includes a hydraulic oil pathway 3 for supplying oil from the pump apparatus 8 to the hydraulic control part 2, and a lubricating oil pathway 5 for supplying oil containing an air bubble to the part to be lubricated 4. The pump apparatus 8 includes a multi-stage trochoid pump 9 and has an air bubble-containing oil discharging part 11 for discharging the oil containing an air bubble to the first stage trochoid pump part 6. The air bubble-containing oil discharging part 11 is connected to the lubricating oil pathway 5. The second stage trochoid pump part 7 increases pressure of the oil discharged from the first stage trochoid pump part 6, and discharges it from the high-pressure oil discharging part 13. The hydraulic oil pathway 3 is connected to the high-pressure oil discharging part 13.

6 Claims, 6 Drawing Sheets

(51) Int. Cl.
*F04C 11/00* (2006.01)
*F04C 13/00* (2006.01)

(52) U.S. Cl.
CPC ....... *F04C 13/007* (2013.01); *F16H 57/0446* (2013.01); *F04C 2210/206* (2013.01); *F16H 57/0489* (2013.01)

(56) References Cited

FOREIGN PATENT DOCUMENTS

| | | |
|---|---|---|
| JP | 2002-266997 A | 9/2002 |
| JP | 2002-339874 A | 11/2002 |
| JP | 2009-248002 A | 10/2009 |
| JP | 2010-261508 A | 11/2010 |
| JP | 2011-12774 A | 1/2011 |

* cited by examiner

HYDRAULIC CIRCUIT FOR TRANSMISSIONS

TECHNICAL FIELD

The present invention relates to a hydraulic circuit for transmissions configured to supply oil to a transmission. The hydraulic circuit is provided with a hydraulic control part operated by an oil pressure and a part to be lubricated requiring supply of lubricating oil.

BACKGROUND ART

In a continuously variable transmission (CVT) used in an automobile and the like, a CVT fluid (oil) is supplied to a part to be lubricated requiring oil for lubrication, power transmission, cooling, and the like by an oil pump, as well as to an hydraulic control part requiring oil for transmitting an oil pressure in controlling a transmission gear ratio by an oil pressure.

The oil to be supplied is collected by a collecting part such as an oil pan provided at a bottom of the CVT, for example. The oil collected by the collecting part is fed again into the part to be lubricated and the hydraulic control part by the oil pump.

For example, in a case where the part to be lubricated of the CVT is rotated at a high speed and the like, bubbling occurs to the oil fed into the part to be lubricated.

In a case where an air bubble is mixed in the collected oil due to the bubbling and other reasons, an operational failure and a drop in the oil pressure may occur as a result of air entrainment by the oil pump, which has sucked the collected oil.

That is, the oil pressure in the hydraulic circuit may become unstable.

Therefore, it is proposed that a hydraulic circuit for transmissions, for example, is provided with a main oil pathway, through which oil is circulated by a main pump and is fed into a hydraulic operation part operated by an oil pressure, and with a separately-provided sub pump (see, for example, Patent Literature 1).

In Patent Literature 1, the oil is fed into the hydraulic operation part through the main oil pathway by the main pump, and when the oil pressure drops in the main oil pathway, oil is supplied to the main oil pathway by the sub pump, whereby it is possible to prevent a drop in the oil.

Furthermore, oil that has been discharged accompanying operation of the hydraulic operation part is recirculated, for example, in another part requiring the oil.

At this time, a destination for discharging the oil to be excessive is a position where only the sub pump can suck the oil.

At this position, there is a fear that the oil may contain an air bubble caused by discharging the oil to be excessive.

Therefore, the oil containing an air bubble is sucked on the sub pump side, whereby it is configured such that the main pump does not easily suck an air bubble.

Accordingly, intrusion of an air bubble into the main pump and the main oil pathway side can be suppressed.

Furthermore, there is proposed an oil strainer, arranged on a suction side of an oil pump for a transmission, for suppressing intrusion of an air bubble into the oil pump side while achieving downsizing (see, for example, Patent Literature 2).

Furthermore, a proposal has been made, although not for removing an air bubble, for improving a lubrication performance and a cooling performance of the part to be lubricated by spraying oil mist, which is a mixture and an atomization of oil and air, to apart to be lubricated (see, for example, Patent Literature 3).

CITATION LIST

Patent Literature

Patent Literature 1: JP 2010-261508 A
Patent Literature 2: JP 2011-12774 A
Patent Literature 3: JP 2000-274516 A

SUMMARY OF INVENTION

Technical Problem

In Patent Literature 1, in addition to requiring two pumps, a plurality of oil pathways, not required before, is required other than the main oil pathway, which feeds oil to the hydraulic operation part by the main pump, such as an oil pathway leading from the sub pump to the main oil pathway and an oil pathway for feeding excessive oil to a suction position of the sub pump, which is different from a suction position of the main pump. Therefore, the hydraulic circuit may become complicated.

Accordingly, a cost of the hydraulic circuit may be increased.

Furthermore, there is a limit to preventing mixture of an air bubble by the strainer in Patent Literature 2, whereby it is difficult to sufficiently stabilize an oil pressure of the hydraulic circuit.

The present invention has been made in view of the above circumstance, and an objective thereof is to provide an hydraulic circuit for transmissions with which, while suppressing the hydraulic circuit from becoming complicated, it is possible to suppress an operational failure of an oil pump and a drop in the oil pressure of the hydraulic circuit caused by air entrainment, and to stabilize an oil pressure in the hydraulic circuit.

Solution to Problem

In order to achieve the above objective, a hydraulic circuit for transmissions of the present invention includes:

a hydraulic oil pathway configured to supply hydraulic oil to a hydraulic control part of a transmission, the hydraulic control part hydraulically controlling the transmission;

a lubricating oil pathway for supplying the oil to a part to be lubricated configured to be lubricated by the oil of the transmission;

a collecting part configured to collect the oil to be supplied to the hydraulic control part and the part to be lubricated; and a pump apparatus configured to supply the oil from the collecting part to the hydraulic oil pathway and the lubricating oil pathway, wherein the pump apparatus includes:

a low-pressure oil discharging unit having an air bubble-containing oil discharging part configured to separate an air bubble from the oil sucked from the collecting part and to discharge the oil containing an air bubble to the lubricating oil pathway, and a low-pressure oil discharging part configured to discharge the oil from which an air bubble has been separated; and a high-pressure oil discharging unit having a high-pressure oil discharging part configured to increase pressure of the oil supplied from the low-pressure oil discharging part of the low-pressure oil discharging unit to have a higher pressure than the oil discharged from the low-pressure oil discharging part, and to discharge the oil to the hydraulic oil pathway.

In the present invention, basically, the hydraulic circuit should include the hydraulic oil pathway leading from a pump apparatus to the hydraulic control part, the lubricating oil pathway leading from the pump apparatus to the part to be lubricated, and an oil pathway for collecting oil discharged from the hydraulic control part and oil flowed down from the part to be lubricated by the collecting part, whereby it is possible to suppress the hydraulic circuit from becoming complicated.

Furthermore, since the air bubble-containing oil discharging part of the low-pressure oil discharging unit of the pump apparatus is connected to the lubricating oil pathway, and the high-pressure oil discharging part of the high-pressure oil discharging unit is connected to the hydraulic oil pathway, the lubricating oil pathway and the hydraulic oil pathway are separated in the pump apparatus, whereby it is possible to constitute a simpler hydraulic circuit.

In other words, since it is configured such that an air bubble is removed in the pump apparatus, an oil containing many air bubbles to be removed is directly fed from the pump apparatus to the part to be lubricated, and the oil from which the air bubbles are removed is directly fed from the pump apparatus to the hydraulic control part, it is possible to simplify the hydraulic circuit.

Furthermore, in the low-pressure oil discharging unit, even if an air bubble is sucked, the air bubble-containing oil is discharged in a stage before a step of compressing and discharging the oil, whereby it is possible to suppress air entrainment and to prevent an operational failure.

In the high-pressure oil discharging unit configured to suck the oil, from which an air bubble has been separated in the low-pressure oil discharging unit, to increase a pressure of the oil, and to discharge the oil, the air entrainment does not occur, whereby it is possible to supply a stable oil pressure by increasing the pressure of the oil.

As described above, since the hydraulic circuit is simplified, as well as the oil, from which an air bubble is removed by the low-pressure oil discharging unit of the hydraulic apparatus, is fed into the high-pressure oil discharging unit, and the highly pressurized oil is fed into the hydraulic control part, whereby it is possible to prevent the oil pressure from becoming unstable due to an air bubble, and to stabilize the oil pressure in the high-pressure oil discharging unit excluding on the lubricating oil pathway side, in the hydraulic oil pathway, and in the hydraulic control part.

Furthermore, on the lubricating oil pathway side, by using the air bubble-containing oil, there is a possibility of improving a cooling performance and a lubrication performance.

Preferably, in the above configuration of the present invention, the low-pressure oil discharging unit is a trochoid pump having the air bubble-containing oil discharging part and the low-pressure oil discharging part.

Accordingly, it is possible to perform centrifugal separation of an air bubble by the trochoid pump, to discharge the oil containing many air bubbles from the air bubble-containing oil discharging part, and to discharge the oil from which the air bubbles have been separated from the low-pressure oil discharging part.

Preferably, in the above configuration of the present invention, the high-pressure oil discharging unit is a multi-stage trochoid pump.

Accordingly, it is possible to increase pressure of the oil discharged from the low-pressure oil discharging part of the low-pressure oil discharging unit by a multi-stage trochoid pump, and to feed the oil having a pressure suitable for transmitting the oil pressure from the high-pressure oil discharging part to the hydraulic control part.

That is, by using a trochoid pump of a multi-stage type, not a one-stage type, it is possible to increase the pressure of the oil more easily and to adapt to an oil pressure used in the hydraulic control part.

Furthermore, in the above configuration of the present invention, the pump apparatus includes the multi-stage trochoid pump, the multi-stage trochoid pump is provided with the air bubble-containing oil discharging part configured to discharge the air bubble-containing oil at least in the first stage from an oil suction side, and with the high-pressure oil discharging part configured to discharge oil in the final stage, the oil being increased in pressure by the oil, from which an air bubble has been separated, being fed from the first stage to a following stage in order, wherein at least a stage to be the first stage of the multi-stage trochoid pump is the low-pressure oil discharging unit, and a stage after the first stage is the high-pressure oil discharging unit.

Accordingly, it is possible to realize an oil pump apparatus configured to discharge the oil containing an air bubble on the part to be lubricated side at low pressure, and to discharge the oil from which an air bubble is separated on the hydraulic control part side at high pressure, with one multi-stage trochoid pump.

Herein, it is also possible to configure the oil pump apparatus to have two pumps, a pump serving as a low-pressure oil discharging unit and a pump serving as a high-pressure oil discharging unit. The oil pump apparatus can be simplified by configuring such that one multi-stage trochoid pump serves as the oil pump apparatus, whereby it is possible to make designing such as of installation of the oil pump apparatus easier.

Furthermore, it is also possible to downsize the oil pump apparatus.

Note that the low-pressure oil discharging part is, for example, a part where oil flows from the first stage to the second stage.

Advantageous Effects of Invention

According to the present invention, it is possible to suppress an operational failure due to suction of air by the oil pump and a defect caused by a drop in the oil pressure without complicating the hydraulic circuit.

DESCRIPTION OF EMBODIMENTS

Hereinafter, an embodiment according to the present invention is described with reference to the drawings.

Figure 1:
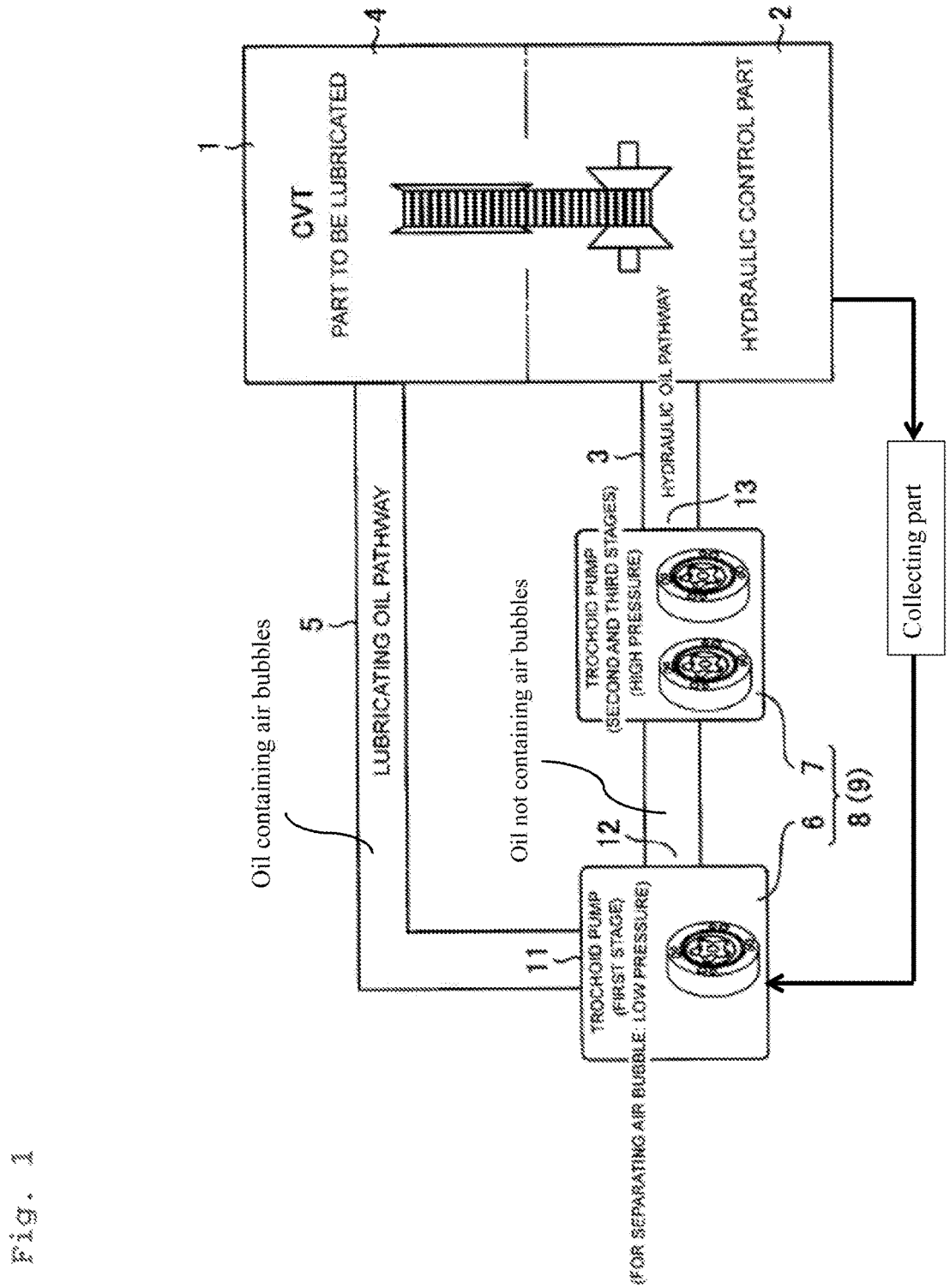
FIG. 1 is a schematic view of a hydraulic circuit for transmissions according to an embodiment of the present invention.
Figure 2:
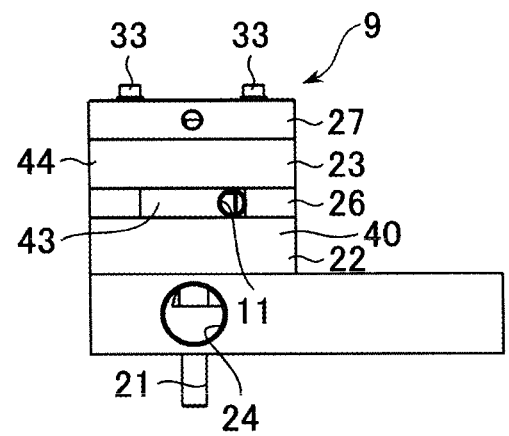
FIG. 2 is a side view of a multi-stage trochoid pump used in the hydraulic circuit for transmissions.
Figure 3:
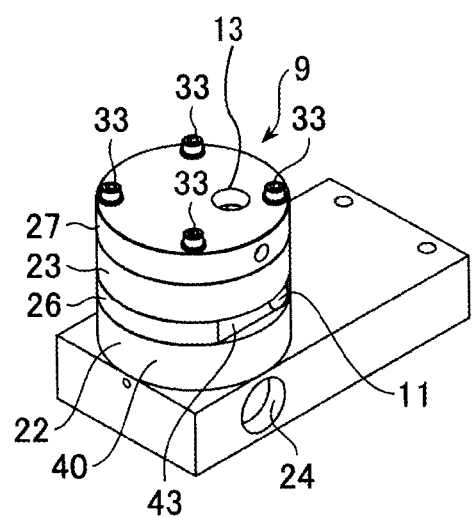
FIG. 3 is a perspective view of the multi-stage trochoid pump.
Figure 4:
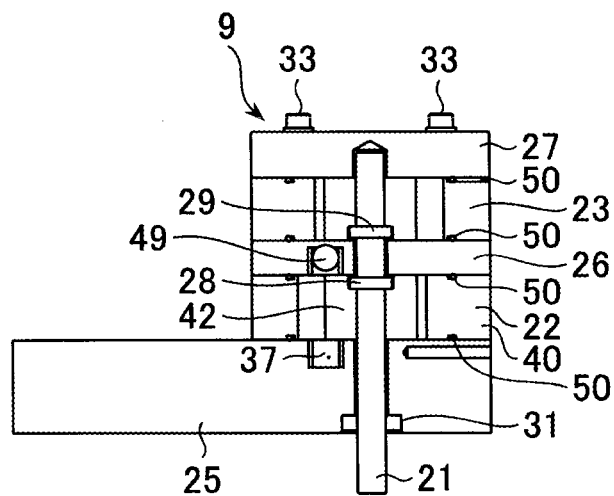
FIG. 4 is a sectional view of the multi-stage trochoid pump.
Figure 5:
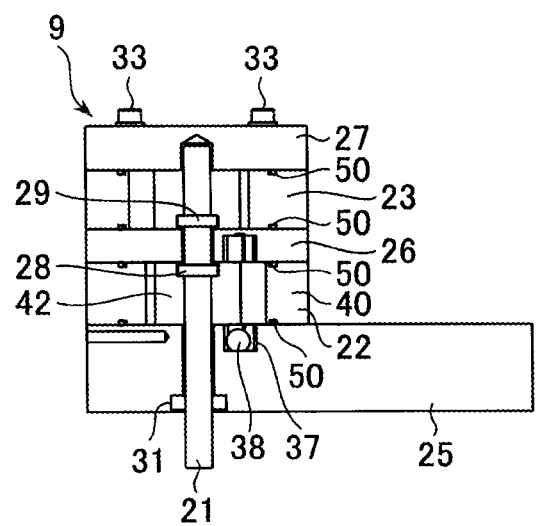
FIG. 5 is a sectional view of the multi-stage trochoid pump.
Figure 6:
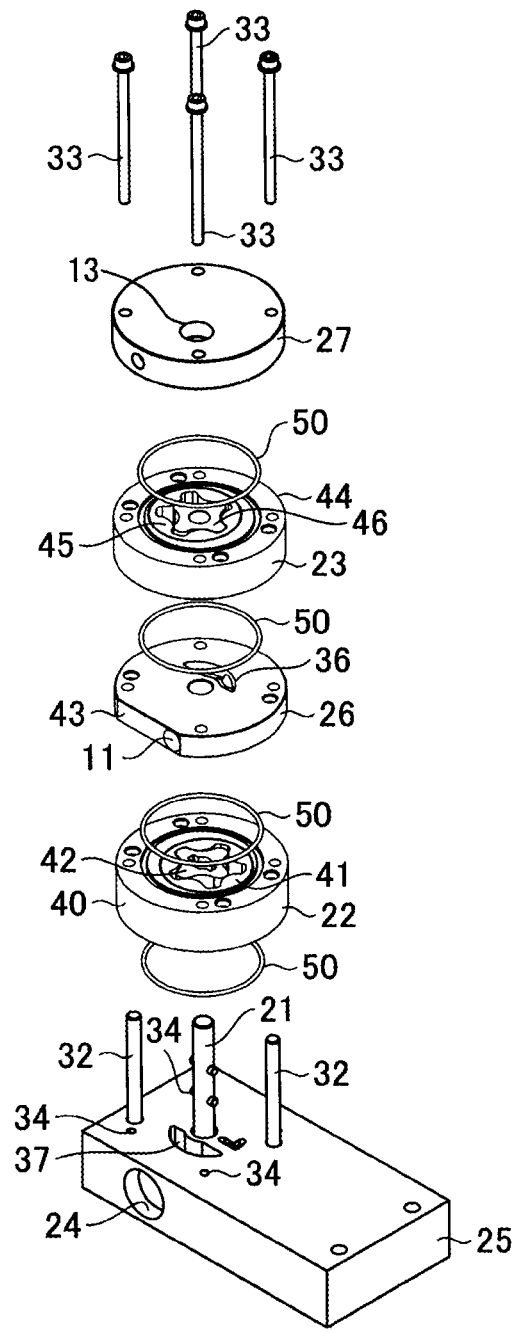
FIG. 6 is an exploded perspective view illustrating the multi-stage trochoid pump.
Figure 7:
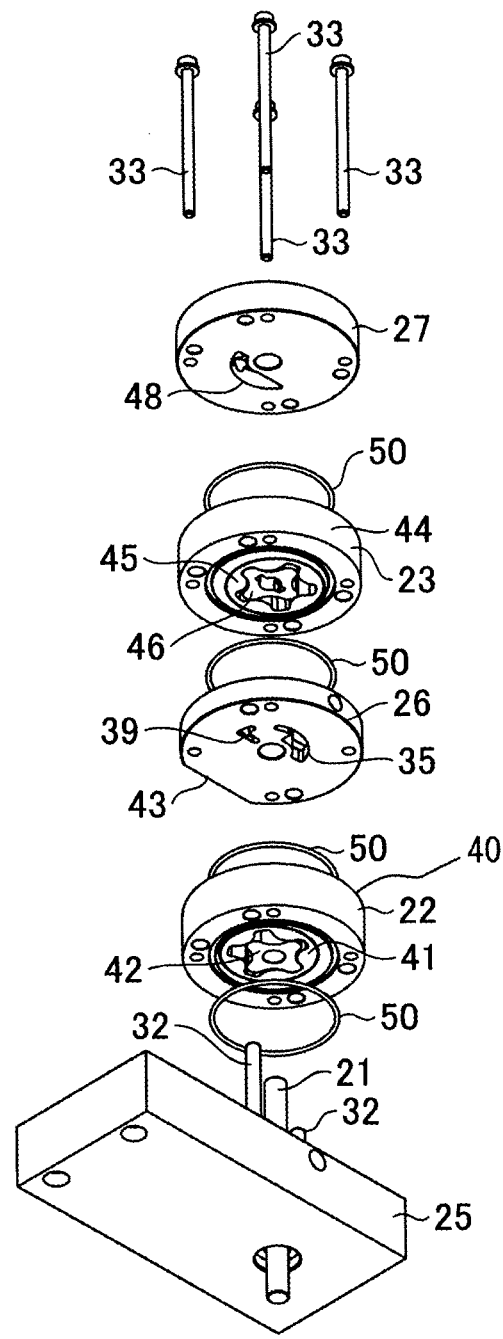
FIG. 7 is an exploded perspective view of the multi-stage trochoid pump.

As illustrated in FIG. 1, a hydraulic circuit for transmissions according to this embodiment is provided, for example, in a CVT 1, or a continuously variable transmission, and includes: a hydraulic oil pathway 3 configured to supply a hydraulic oil (CVT fluid) to a hydraulic control part 2 of the CVT 1, the hydraulic control part 2 hydraulically controlling the CVT 1; a lubricating oil pathway 5 for supplying oil to a part to be lubricated 4 to be lubricated by the oil of the CVT 1;

a collecting part (for example, an oil pan or an oil reservoir) in which oil supplied to the hydraulic control part 2 and the part to be lubricated 4 is collected; and a pump apparatus 8 configured to supply the oil from the collecting part to the hydraulic oil pathway 3 and the lubricating oil pathway 5.

The CVT 1 is, for example, a belt type CVT, and is provided with a belt and two pulleys, each having a width adjustable by oil pressure.

Note that the CVT 1 is not limited to a variety of belt types. It may also be a chain type or a toroidal type.

The CVT 1 is, for example, configured to be the part to be lubricated 4 in which supply of lubricating oil is required to a part where the belt and the pulleys come in contact through the lubricating oil.

In the part to be lubricated 4, oil is used for lubrication and cooling of the belt and the pulleys as well as for power transmission between the belt and the pulleys.

In the CVT 1, the width of the pulleys is changed by the oil pressure when a transmission gear ratio is changed, and the hydraulic control part 2 is provided for changing the width of the pulleys.

The pump apparatus 8, which sends out the oil to the hydraulic control part 2 and the part to be lubricated 4, is configured to be a multi-stage trochoid pump 9 in this embodiment.

The multi-stage trochoid pump 9 has a first stage trochoid pump part (low-pressure oil discharging unit) 6 configured to function as a pump for separating an air bubble and to discharge oil containing many air bubbles from an air bubble-containing oil discharging part 11 due to a centrifugal force.

The air bubble-containing oil discharging part 11 is connected to the lubricating oil pathway 5, and the oil containing many air bubbles is supplied toward the part to be lubricated 4 of the CVT 1.

Furthermore, the oil, from which an air bubble is separated in the first stage trochoid pump part 6 for separating an air bubble, is lead into a high-pressure trochoid pump part 7 through a low-pressure oil discharging part 12, which is a flow passage connected to the high-pressure trochoid pump part 7 in the second stage or after.

Furthermore, to a final stage part (here, the final stage is the second stage, but a third stage or after in a case where a multi-stage trochoid pump having three stages or more is used) of the high-pressure trochoid pump part 7, which is the second stage or after of the multi-stage trochoid pump 9, a high-pressure oil discharging part 13, which is a discharge port of the multi-stage trochoid pump, is provided.

This high-pressure oil discharging part 13 is connected to the hydraulic oil pathway 3.

The multi-stage trochoid pump 9 according to this embodiment illustrated in FIGS. 2 to 7 is of a two-stage type.

Note that it may also be a multi-stage trochoid pump of three or more-stage type. In order to increase the oil pressure, it is preferable that it be a three or more-stage type rather than a two-stage type.

The multi-stage trochoid pump 9 according to this embodiment has trochoid parts 22 and 23 disposed in an axial direction of a rotation axis 21 in multiple stages. In this embodiment, the first stage trochoid part 22 and the second stage trochoid part 23 are provided.

This multi-stage trochoid pump 9 includes: a suction port 24;

a base 25 having the rotation axis 21; the first stage trochoid part 22 provided on the base 25; the second stage trochoid part 23 provided above it; a partition wall 26 arranged between the first stage trochoid part 22 and the second stage trochoid part 23; and a cover 27 arranged on the second stage trochoid part 23.

The base 25 is a rectangular plate-shaped member through which the rotation axis 21 is arranged so as to penetrate, and is provided with a radial bearing 31, which rotatably supports the rotation axis 21.

Furthermore, on an upper surface of the base 25, at positions apart at a substantially equal distance from the rotation axis 21 on the left and the right sides thereof, fixed shafts 32 are provided for limiting a move of the first stage trochoid part 22, the partition wall 26, the second stage trochoid part 23, and the cover 27 in a planar direction along the upper surface of the base 25.

Furthermore, on the base 25, there are provided four screw holes 34 into which four screws 33 are screwed for fixing the first stage trochoid part 22, the partition wall 26, the second stage trochoid part 23, and the cover 27 to the base 25.

The screw holes 34 are arranged at a substantially equal interval along a circumferential direction centering on the rotation axis 21.

Furthermore, there is provided a suction side opening 37 facing a space corresponding to a part between an inner rotor 42 and an outer rotor 41, which are described below, of the first stage trochoid part 22 on the upper surface of the base 25, and communicating with the suction port 24.

Note that between the suction port 24 and the suction side opening 37, a check valve 38 is provided to limit flow of oil in an opposite direction of a suction direction.

To the rotation axis 21, a pin 28 for integrally and rotatably fixing the inner rotor 42, described below, of the first stage trochoid part 22 to the rotation axis 21, and a pin 29 for integrally and rotatably fixing an inner rotor 46, described below, of the second stage trochoid part 23 to the rotation axis 21 are provided so as to be orthogonal to the rotation axis 21.

The first stage trochoid part 22 includes: a cylindrical casing 40; the outer rotor 41, which is an inscribed gear arranged inside thereof; and the inner rotor 42, which is a gear arranged inside the outer rotor 41 and rotates with a rotation of the rotation axis 21.

The trochoid pump (inscribed gear pump) is configured such that an external tooth of the inner rotor 42 is engaged with an internal tooth of the outer rotor 41.

Furthermore, by rotary driving the inner rotor 42, the outer rotor 41 follows it.

A rotation center of the inner rotor 42 is offset relative to a rotation center of the outer rotor 41, whereby it is narrow in a part where the outer rotor 41 and the inner rotor 42 are engaged, and a space between the outer rotor 41 and the inner rotor 42 is wide in a position 180 degrees opposite of an engaging position.

The engaging position of the outer rotor 41 and the inner rotor 42 is substantially constant relative to the casing 40, and relative to the engaging position, the space between the outer rotor 41 and the inner rotor 42 becomes wider in a first part of the rotation, whereby it becomes a suction side.

Furthermore, relative to the engaging position, the space between the outer rotor 41 and the inner rotor 42 becomes narrower in a latter part of the rotation, whereby it becomes a discharge side.

Corresponding to the above-described position on the suction side, the above-described suction side opening 37 is provided in the base 25.

The base 25 is in a state where a lower side opening of the cylindrical casing 40 of the first stage trochoid part 22 is blocked.

Furthermore, the partition wall 26 is formed into a plate shape for blocking an opening on an upper side of the cylindrical casing 40, and corresponding to an above-described position on the discharge side, a discharging side opening 35 is formed therein.

Herein, oil existing inside a valley portion of the internal tooth of the outer rotor is rotated with a rotation of the outer rotor 41, and is applied with the centrifugal force. Since an air bubble, which is lighter than the oil, comes to a rotation center side (inside) of the valley, by forming an air bubble-containing oil opening 39 for the air bubble-containing oil discharging part 11 in a valley portion of the internal tooth of the outer rotor 41 on the above-described discharge side, it is possible to cause the oil containing an air bubble to be discharged, and to separate an air bubble from the oil.

The partition wall 26 is arranged between the first stage trochoid part 22 and the second stage trochoid part 23, and as described above, blocks the opening on the upper surface side of the cylindrical casing 40 of the first stage trochoid part 22 while also blocking an opening on the lower surface side of a below-described tubular casing 44 of the second stage trochoid part 23.

The partition wall 26 is formed into a substantially disk shape corresponding to the casings 40 and 44, but is provided with a cut out portion 43, which is a shape cut off in a direction orthogonal to a radial direction. At one end of the cut out portion 43, an opening to be the above-described air bubble-containing oil discharging part 11 is formed.

Furthermore, on the lower surface side of the partition wall 26, the discharging side opening 35 is formed corresponding to a position on the discharge side of the above-described first stage trochoid part 22 below it.

Furthermore, in the partition wall 26, the air bubble-containing oil opening 39 is formed in a part where the above-described oil containing an air bubble is collected, and the air bubble-containing oil opening 39 communicates with the air bubble-containing oil discharging part 11.

The air bubble-containing oil opening 39 is connected to the lubricating oil pathway 5.

Furthermore, on the upper surface side of the partition wall 26, a suction side opening 36 is formed corresponding to a position on a suction side, described below, of the second stage trochoid part 23. The suction side opening 36 communicates with the discharging side opening 35 on the lower surface of the partition wall 26.

Accordingly, the oil discharged from the first stage trochoid part 22 is sucked into the second stage trochoid part 23.

In a communication part of the suction side opening 36 and the discharging side opening 35 of the partition wall 26, there is provided a check valve 49 for preventing a flow from the suction side opening 36 to the discharging side opening 35.

The suction side opening 36 and the discharging side opening 35, which are communicated, constitute a low-pressure oil discharging part of the first stage trochoid part 22, or a low-pressure oil discharging unit. The low-pressure oil discharging part is connected to the second stage trochoid part 23, or a high-pressure oil discharging unit.

The second stage trochoid part 23, in the same way as the first stage trochoid part 22, basically includes the casing 44, an outer rotor 45, and the inner rotor 46, and in the same way as the first stage trochoid part 22, a position on the oil suction side and a position on the oil discharging side are set in an engaging part of the outer rotor 45 and the inner rotor 46.

Note that in the partition wall 26, the discharging side opening 35 arranged in the position on the discharge side of the first stage trochoid part 22 and the suction side opening 36 arranged in a position on the suction side of the second stage trochoid part 23 are arranged so as to vertically overlap with each other in the partition wall 26. Therefore, it is arranged such that the engaging position is shifted between the outer rotors 41 and 45 and the inner rotors 42 and 46, respectively, in the first stage trochoid part 22 and the second stage trochoid part 23 such that the position on the discharge side of the first stage trochoid part 22 and the position on the suction side of the second stage trochoid part 23 overlap with each other.

The cover 27 is formed into a disk shape so as to block an opening on an upper side of the cylindrical casing 44 of the second stage trochoid part 23.

On a lower surface of the cover 27, a discharging side opening 48 is provided at an above-described position on the discharge side of the second stage trochoid part 23.

Furthermore, an the upper surface of the cover 27, the high-pressure oil discharging part 13 communicating with the discharging side opening 48 is provided.

The high-pressure oil discharging part 13 is connected to the hydraulic oil pathway 3.

Furthermore, in the casing 40, the partition wall 26, and the casing 44, a through hole through which the fixed shaft 32 penetrates and a through hole through which the screw 33 penetrates are formed.

In the cover 27, a through hole through which the screw 33 penetrates and an insertion hole into which a tip of the fixed shaft 32 is inserted are formed.

Furthermore, in the inner rotor 42, the partition wall 26, and the inner rotor 46, a through hole through which the rotation axis 21 penetrates is formed.

Furthermore, in the cover 27, an insertion hole through which a tip part of the rotation axis 21 is inserted is formed.

Furthermore, an O-ring 50 is arranged between the base 25 and the casing 40, between the casing 40 and the partition wall 26, between the partition wall 26 and the casing 44, and between the casing 44 and the cover 27, respectively.

The base 25, the first stage trochoid part 22, the partition wall 26, and the like constitute the first stage trochoid pump part 6 for separating an air bubble. The partition wall 26, the second stage trochoid part 23, the cover 27, and the like constitute the second stage high-pressure trochoid pump part 7. These two constitute the pump apparatus 8.

According to this multi-stage trochoid pump 9, an air bubble is separated from the oil by the first stage trochoid part 22 (low-pressure oil discharging unit), and the oil containing many air bubbles is supplied from the air bubble-containing oil discharging part 11 to the lubricating oil pathway 5.

Furthermore, the low-pressure oil from which an air bubble is separated by the first stage trochoid part 22 is fed into the second stage trochoid part 23 (high-pressure oil discharging unit) through the low-pressure oil discharging part 12, where a pressure thereof is increased, and the high-pressure oil from which an air bubble has been separated is fed from the high-pressure oil discharging part 13 to the hydraulic oil pathway.

Accordingly, the oil containing an air bubble can be fed from the pump apparatus 8 to the part to be lubricated 4 such as a contacting part of the belt and the pulleys, for example, of the CVT 1. Furthermore, in a different line, the hydraulic oil having an increased pressure can be fed from the pump apparatus 8 to the hydraulic control part 2, which performs transmission by changing a pulley width by oil pressure in the CVT 1.

Accordingly, the hydraulic pathway is simplified, and feeding of an air bubble to the hydraulic control part 2 can be suppressed, whereby it is possible to suppress a drop in pressure caused by mixture of an air bubble as well as a defect accompanied by an occurrence of a problem other than the drop in the pressure caused by the mixture of an air bubble in the hydraulic control part 2.

Furthermore, in a case where output of the pump apparatus 8 is set based on an assumption that the oil pressure may become unstable, when the output of the pump apparatus 8 is optimized by further stabilizing the oil pressure, it is possible to decrease a driving force required by the pump apparatus 8.

The pump apparatus 8, for example, is driven by a driving force transmitted from an engine in a case of an automobile and the like, whereby it is possible to improve a fuel efficiency by decreasing the output from the pump apparatus 8.

Furthermore, since the low-pressure oil discharging unit for separating an air bubble from the oil and for sending out the oil containing an air bubble to the part to be lubricated, and the high-pressure oil discharging unit for increasing pressure of the oil, from which an air bubble has been separated, and feeding it to the hydraulic control part are configured to be one integral multi-stage trochoid pump 9, it is possible to make the pump apparatus 8 compact and to downsize and save weight of the transmission. Accordingly, it is possible to save weight and the like of the automobile.

In a case where the multi-stage trochoid pump sucks the oil containing an air bubble, lubrication oil becomes the oil containing an air bubble; however, by supplying the oil containing an air bubble to the part to be lubricated, there is a possibility of improving the cooling and lubrication performances.

Note that the two-stage type trochoid pump is used in the above-described embodiment. The first stage thereof is the low-pressure oil discharging unit for separating an air bubble, and the second stage thereof is the high-pressure oil discharging unit for discharging the high-pressure oil for transmitting the oil pressure to the hydraulic control part; however, in order to discharge the high-pressure oil for hydraulic control for lubrication from the multi-stage trochoid pump, a multi-stage trochoid pump having three or more stages may be used, and for example, the second stage and the third stage may be used as the high-pressure oil discharging unit.

Figure 8:
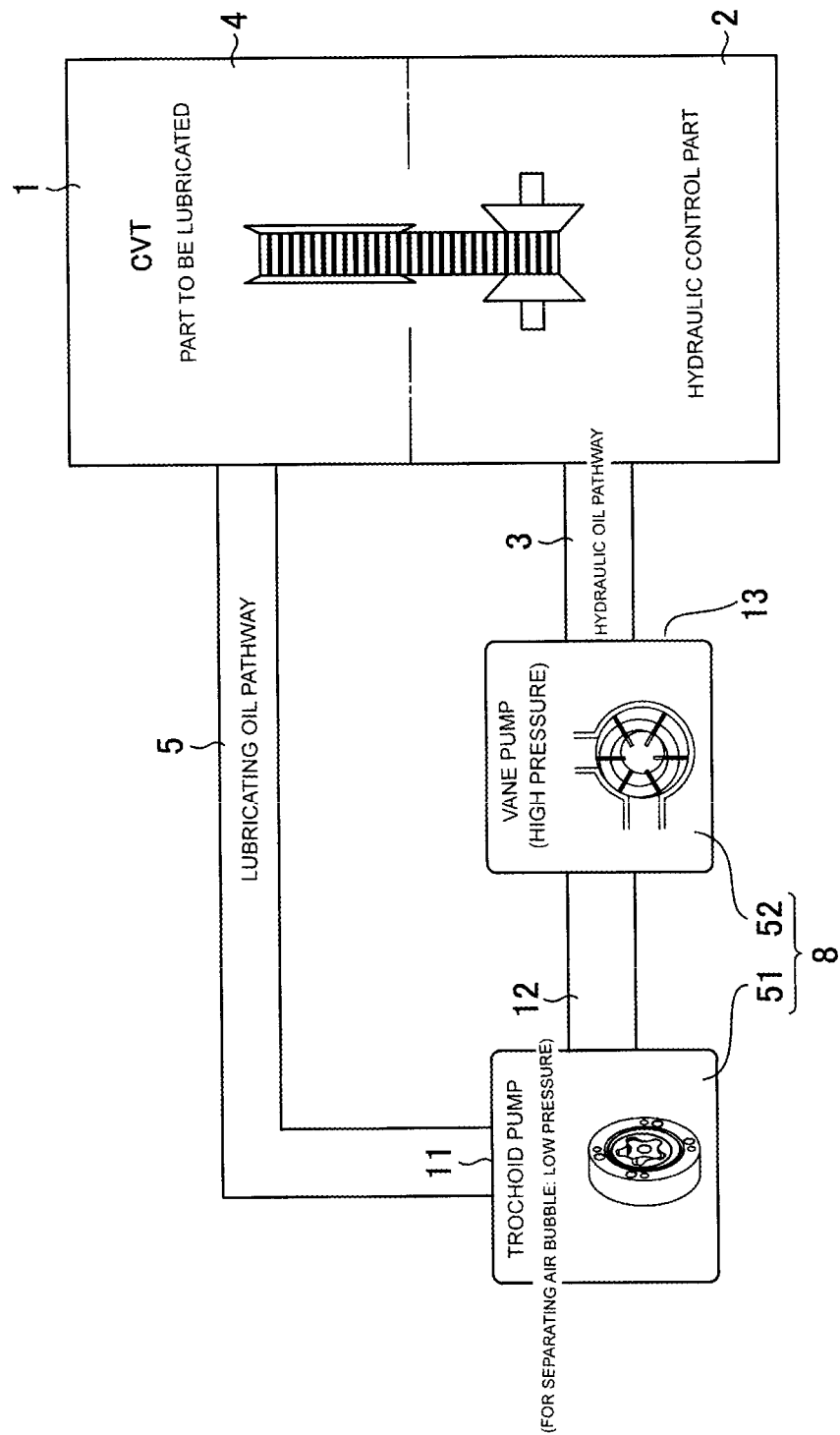
FIG. 8 is a schematic view of a hydraulic circuit for transmissions according to another embodiment of the present invention.

Note that as illustrated in FIG. 8, it is not necessary to configure the pump apparatus 8 to be one pump. For example, the above-described first stage trochoid pump part 6 for separating an air bubble may be an independent trochoid pump 51, which is a low-pressure oil discharging unit and is used for separating an air bubble, and in place of the second stage trochoid pump part 7, a vane pump 52, which is a high-pressure oil discharging unit for discharging the oil, after increasing the pressure thereof, discharged from the low-pressure oil discharging part 12 of the trochoid pump 51.

In this case, each of the trochoid pump 51 and the vane pump 52 is an independent pump, and in the trochoid pump 51, the air bubble-containing oil discharging part 11 is connected to a lubricating oil pathway, and the low-pressure oil discharging part 12 is connected to a suction port of the vane pump 52.

In the hydraulic circuit for transmissions illustrated in FIG. 8 as well, the same function and effect as the hydraulic circuit for transmissions illustrated in FIG. 1 can be enjoyed except for an effect caused by one pump constituting the pump apparatus.

Note that the high-pressure oil discharging unit may also be a trochoid pump, which is different from the trochoid pump as the low-pressure oil discharging unit, in place of the vane pump 52.

In this case, it is preferable that the trochoid pump as the high-pressure oil discharging unit be a multi-stage trochoid pump.

Furthermore, it is also possible to configure the vane pump 52 to be capable of separating an air bubble by the centrifugal force, and use the vane pump as the low-pressure oil discharging unit.

In this case as well, for example, a vane pump or a trochoid pump can be used as the high-pressure oil discharging unit.

REFERENCE SIGNS LIST

1 CVT (transmission)
2 hydraulic control part
3 hydraulic oil pathway
4 part to be lubricated
5 lubricating oil pathway
6 first stage trochoid pump (low-pressure oil discharging unit)
7 second stage trochoid pump (high-pressure oil discharging unit)
8 pump apparatus
9 multi-stage trochoid pump
11 air bubble-containing oil discharging part
12 low-pressure oil discharging part
13 high-pressure oil discharging part
51 trochoid pump (low-pressure oil discharging unit)
52 vane pump (high-pressure oil discharging unit)

The invention claimed is:
1. A hydraulic circuit for a transmission comprising:
a hydraulic oil pathway configured to supply hydraulic oil to a hydraulic control part of the transmission, the hydraulic control part hydraulically controlling the transmission;
a lubricating oil pathway for supplying the oil to a part to be lubricated configured to be lubricated by the oil of the transmission;

a collecting part configured to collect the oil to be supplied to the hydraulic control part and the part to be lubricated; and a pump apparatus configured to supply the oil from the collecting part to the hydraulic oil pathway and the lubricating oil pathway, wherein the pump apparatus includes:
- a low-pressure oil discharging unit having
  - an air bubble-containing oil discharging part configured to discharge oil containing air bubbles to the lubricating oil pathway, and
  - a low-pressure oil discharging part configured to discharge oil not containing the air bubbles to a high-pressure oil discharging unit; and
- the high-pressure oil discharging unit, configured to increase pressure of the oil not containing the air bubbles supplied from the low-pressure oil discharging part of the low-pressure oil discharging unit, and to discharge the oil not containing the air bubbles to the hydraulic oil pathway.

2. The hydraulic circuit for a transmission according to claim 1, wherein the low-pressure oil discharging unit is a trochoid pump having the air bubble-containing oil discharging part and the low-pressure oil discharging part.

3. The hydraulic circuit for a transmission according to claim 1, wherein the high-pressure oil discharging unit is a multi-stage trochoid pump.

4. The hydraulic circuit for a transmission according to claim 1,
wherein the low-pressure oil discharging unit of the pump apparatus includes a first stage of a multi-stage trochoid pump,
wherein high-pressure oil discharging unit of the pump apparatus includes at least two stages of the multi-stage trochoid pump, one of the at least two stages included in the high-pressure oil discharging unit being a final stage which discharges the oil not containing the air bubbles to the hydraulic oil pathway.

5. The hydraulic circuit for a transmission according to claim 1, wherein the low-pressure oil discharging unit and high-pressure oil discharging unit are driven by a common shaft.

6. The hydraulic circuit for a transmission according to claim 1, wherein the low-pressure oil discharging unit includes a partition wall comprising the air bubble-containing oil discharging part and the low-pressure oil discharging part.

* * * * *